Fig. 4.

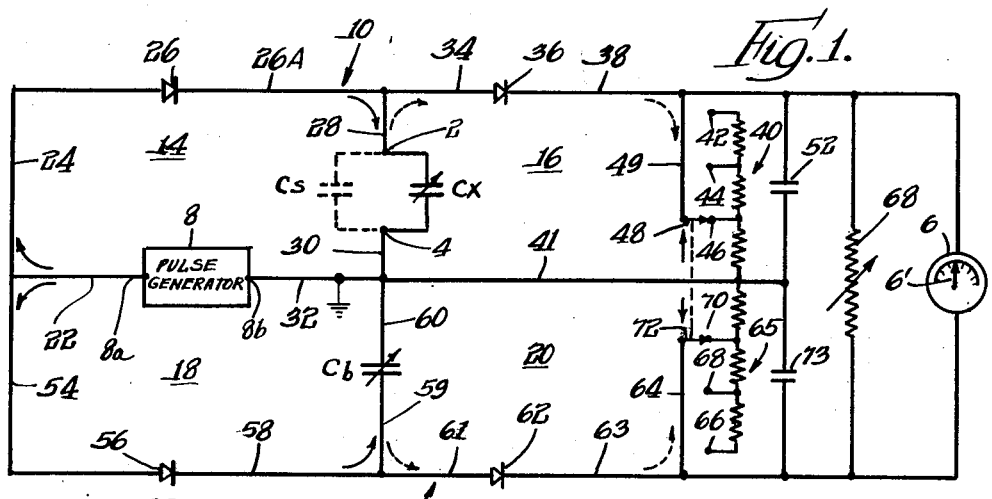

INVENTORS
Jerome Tannenbaum
Walter Scott Bartky
Wallenstein & Spangenberg
Attys 3,135,916
APPARATUS FOR MEASURING SMALL CAPACITANCE VALUES INDEPENDENT OF STRAY CAPACITANCE
Jerome Tannenbaum, Chicago, and Walter Scott Bartky, Champaign, Ill., assignors, by mesne assignments, to International Telephone and Telegraph Corporation, Baltimore, Md., a corporation of Maryland
Filed May 18, 1960, Ser. No. 29,900
2 Claims. (Cl. 324—60)

This invention relates to capacitance measuring apparatus and the like, and particularly to capacitance measuring apparatus for measuring very small capacitance values. The present invention has particular utility in liquid level indicators using capacitance probes immersed in the liquid whose level is to be indicated, where the capacitance of the probe is a function of the degree to which the probe is submerged in the liquid.

It is an object of the present invention to provide improved capacitance measuring apparatus capable of measuring with great accuracy capacitances of very low values, as, for example capacitances of the order of tenths of a micromicrofarad and with equipment of relatively simple, rugged and reliable construction. A related object of the present invention is to provide capacitance measuring apparatus as just described, which does not require the use of amplifiers. This avoids the problem of instability caused by drift and other factors, a problem commonly present with sensitive measuring equipment using amplifiers, particularly direct current amplifiers.

Still another object of the present invention is to provide capacitance measuring apparatus as above described which is substantially linear over an extremely wide range, extending from practically zero capacitance to very large capacitance values. This is in contrast to capacitance measuring equipment heretofore developed which for the most part, are inherently non-linear devices operating, for example, on a Wheatstone bridge balancing principle or the like, or on a principle involving the direct measurement of the A.C. reactance of the capacitance involved.

Another object of the invention is to provide improved capacitance measuring apparatus for measuring very small changes in capacitance in the presence of a relatively large capacitance.

Still another object of the present invention is to provide capacitance measuring apparatus operating on a capacitance charge principle. A related object of the invention is to provide capacitance measuring apparatus as just described which is capable of measuring accurately, without amplifiers, capacitance values of very small magnitudes using ordinary direct current meter movements. A further object of the present invention is to provide capacitance measuring apparatus as just described which is not sensitive to normal instabilities of the voltage source which charges up the capacitance involved.

A further object of the present invention is to provide capacitance measuring apparatus as above described which has particular utility in liquid level measuring applications where the change in liquid level is sensed by measuring the resultant change in the capacity of a capacitance probe inserted into the liquid to be measured. A related object of the invention is to provide liquid level measuring apparatus as just described which is so sensitive that it can operate practically with any liquid having a dielectric constant different than one.

A still further object of the present invention is to provide capacitance measuring apparatus as above described which is constructed, for the most part, of standard commercially available components having a long useful life. A related object of the invention is to provide capacitance measuring apparatus as just described which is substantially insensitive to moisture and temperature variations, and can withstand rough handling.

Another object of the present invention is to provide capacitance measuring apparatus as above described wherein the capacitance to be measured and the instrument indicating the value of the capacitance may be interconnected by a long cable and wherein the accuracy of measurement is not affected by the length of the cable.

Still another object of the present invention is to provide a capacitance measuring apparatus as above described which is relatively inexpensive and simple to construct.

A further object of the invention is to provide capacitance measuring apparatus as above described which has a range changing adjustment and a zero adjustment which are completely independent of one another.

In accordance with the present invention, the capacitance measuring apparatus includes a first capacitance charge circuit which includes the capacitance to be measured and a pulse generator for charging the latter capacitance. The pulse generator most advantageously uses transistors connected as on-off switch elements adapted to provide a continuous train of pulses of a given polarity at a very high pulse repetition rate, as, for example, in the neighborhood of one megacycle or higher. The time constant of the charge circuit is so small that the capacitance becomes fully charged within the duration of one of said pulses. A small time constant discharge circuit is provided for the capacitance to be measured which discharge circuit substantially fully discharges in the interim between successive pulses in said train of pulses. An ordinary sensitive direct current meter movement is used as a capacitance indicating element and this movement is connected into or with one of the aforesaid circuits without any amplifier interposed therebetween. The very high pulse repetition rate of the pulse generator output (which must, of course, have a significant amplitude) and the low time constant characteristics of the charge and discharge circuits cooperate to provide a measuring circuit which does not require an amplifier for its sensitivity.

A resistance variable in discrete steps is placed in the circuit to which the meter movement responds to vary the range of operation of the capacitance measuring apparatus. Another variable resistor is most advantageously positioned in shunt with the meter movement to provide a full scale calibration adjustment for the meter.

One highly advantageous feature of the invention enables the capacitance measuring apparatus to measure accurately exceedingly small capacitance values and to be substantially independent of instabilities in the voltage source feeding the capacitor charge circuit. To this end, a unique balancing circuit is added which cancels the affect of static capacitance on the measuring apparatus. The balancing circuit includes a capacitor forming part of a capacitance charge circuit which is connected in parallel with the first capacitance charge circuit where it is fed by the transistor pulse generator. This second capacitor charge circuit is a low time constant circuit in which the latter capacitor fully charges within the duration of a pulse from the pulse generator. The balancing circuit also includes a small time constant discharge path for the latter capacitor wherein the capacitor substantially fully discharges in the interim between successive pulses from said pulse generator. The balancing circuit is connected with the meter movement so that the effect of the current flow in the balancing circuit on the meter movement acts in opposition to that of the current of the circuit including the capacitance to be measured. Before the capacitance to be measured is connected to the apparatus, the time constant of the balancing circuit is adjusted as by varying the capacitance of the latter capacitor, so that zero deflection is obtained on the meter movement scale, which cancels the effect of the static and stray capacitances in the measuring apparatus. Then, any resultant average current flowing through the meter movement will be proportional only to the value of the capacitance to be measured. It is apparent that inherent instabilities in the pulse generator circuit will have an equal effect on the currents flowing in the balancing circuit and the circuit associated with the capacitance to be measured, which are charged from the same pulse generator.

In one specific form of the invention, the aforesaid direct current meter movement is connected into the discharge paths of the balancing circuit and the capacitance to be measured so that the discharge currents thereof have opposing effects on the meter movement. In such case, there is associated with the discharge path of the balancing circuit a range changing resistance variable in discrete steps and which is ganged for operation with the aforesaid discretely variable range change resistance associated with the discharge path of the capacitance to be measured. One of the corresponding ends of these variable resistances are connected to a common current path. The other ends of the variable resistances are connected into distinct current paths, and the opposite terminals of the meter movement are connected to the remote or latter ends of the variable resistances so that the current flow in the meter is a function of the difference in the voltage drops across the variable resistances. A full scale adjusting resistor may be placed in shunt with the meter movement, which resistor will obviously have no effect on the aforesaid zero or static capacitance balancing adjustment.

Other features of the invention will be described in detail in the specification to follow. One such feature, for example, relates to the incorporation of the capacitance measuring circuit just described in a liquid level indicator.

Refer now to the drawings wherein:

FIG. 1 is a schematic diagram of a form of the present invention usable as a simple capacitance measuring circuit;

FIG. 2 shows the physical components of a liquid level indicator incorporating the present invention;

FIG. 3 is an enlarged vertical sectional view through the capacitance probe head forming one of the components shown in FIG. 2;

FIG. 4 is a schematic diagram of the electrical circuitry of the capacitance probe head shown in FIGS. 2 and 3.

Figure 5:
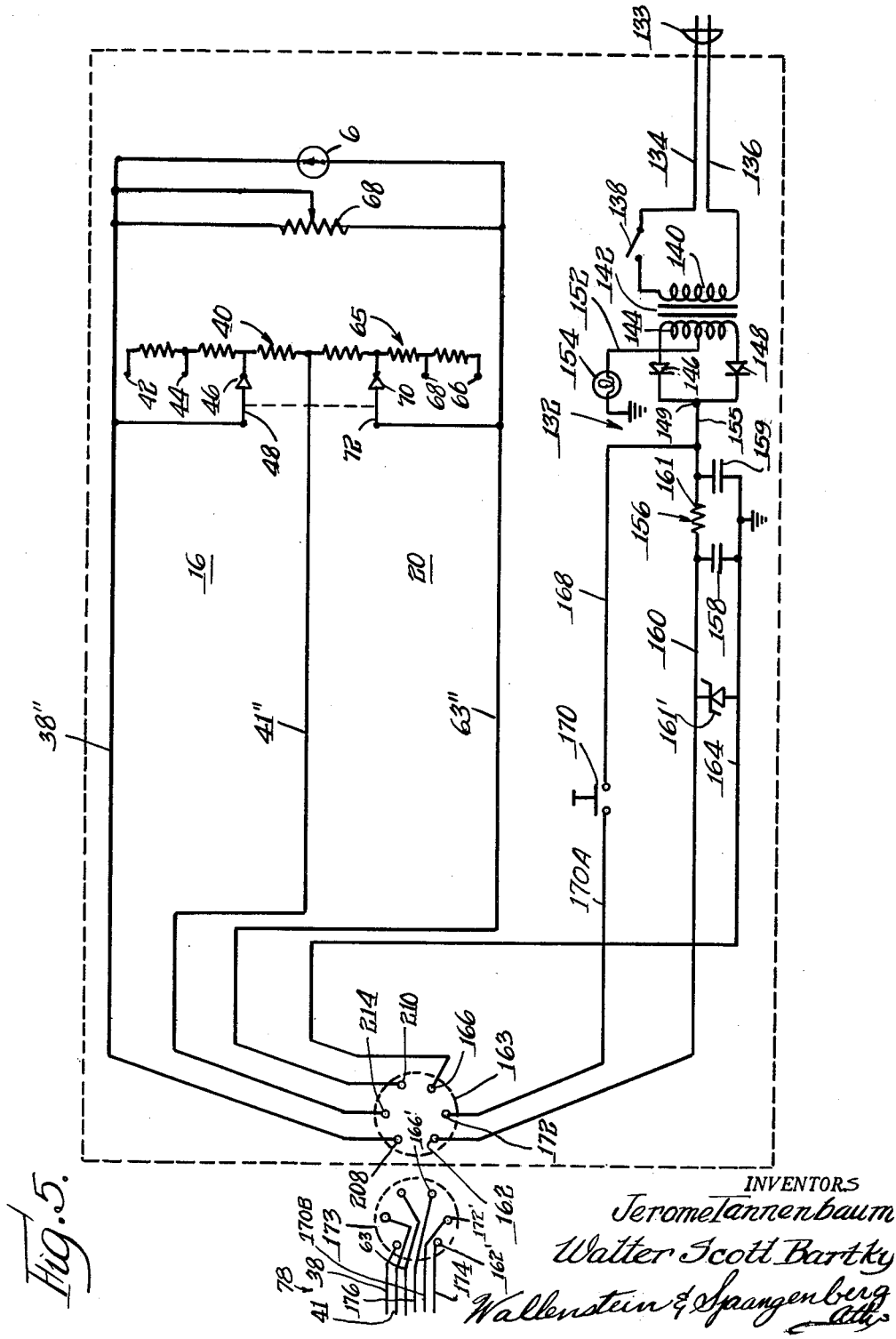
FIG. 5 is a circuit diagram of the electrical circuitry contained within the meter housing forming another one of the components shown in FIG. 2.

Referring now to FIG. 1 which shows a simplified schematic of one form of the present invention, the capacitance measuring circuit there shown includes a pair of input terminals 2 and 4 to which an unknown capacitor to be measured is connected. A sensitive direct current meter movement 6 is used to indicate the capacitance value measured. Various branch circuits to be described interconnect the terminals 2 and 4 and the meter movement 6 to effect the deflection of the pointer 6' of the meter movement in direct proportion to the value of the capacitance to be measured. A source of power for operating the direct current meter is provided in the form of a pulse generator 8. The pulse generator is preferably made of solid state components, such as transistors, used as on-off switching devices for providing a continuous train of voltage pulses of a given polarity. These voltage pulses are developed between the signal output terminal $8a$ and a reference or ground terminal $8b$.

The pulse generator is connected to a measuring circuit 10 in which the unknown capacitance $Cx$ forms an element, and a balancing circuit 12 in which a variable balancing capacitor $Cb$ forms an element. The measuring circuit 10 includes a capacitor charge circuit 14 and a capacitor discharge circuit 16. The balancing circuit 12 includes a charge circuit 18 and a discharge circuit 20. It can be shown that the effective values of the currents flowing in the charge or discharge section of the measuring and balancing circuits 10 and 12 bear a linear relationship to the values of the capacitances in these two circuits. This linear relationship is due basically to the fact that the charge Q stored in a capacitor of value C as a result of a voltage V is a linear relationship expressed by the formula $Q=CV$. The meter movement 6 is differentially connected to the measuring circuit 10 and the balancing circuit 12 so that the currents flowing in these circuits have opposite effects on the meter movement 6. The time constant of the balancing circuit 12 is initially adjusted with the unknown capacitance $Cx$ disconnected from the measuring circuit 10 so that no current flows through the meter movement 6. This cancels out any effect of static and stray capacitance $Cs$ on the meter reading. Then, upon subsequent connection of capacitance $Cx$ into the measuring circuit, the position of the meter pointer 6' will indicate the value of unknown capacitance $Cx$.

Although a variety of circuit arrangements are possible to obtain the aforesaid differential connection of the meter movement 6 with the measuring and balancing circuits 10 and 12, one such circuit shown in FIG. 1 which is satisfactory for many purposes will now be described.

The charge circuit 14 for the unknown capacitor $Cx$ includes a common conductor 22 extending from the signal output terminal $8a$ of pulse generator 8, a conductor 24 extending to a suitable rectifier 26 polarized to pass only pulses of a desired polarity which for illustrative purposes will be considered positive. The rectifier 26 is connected by conductors 26A and 28 to the upper input terminal 2 to which one end of unknown capacitance $Cx$ is connected. A conductor 30 extending from the other input terminal 4 is connected by a conductor 32 to the terminal $8b$ of the pulse generator 8. The time constant of the capacitor charge circuit 14 is such that the largest capacitance $Cs$ plus $Cx$ to be measured is fully charged within the duration of each of the pulses coupled thereto through the rectifier 26. The charge stored on the capacitance $Cs$ plus $Cx$ is proportional both to the amplitude of the voltage pulses of pulse generator 8 and the sum of the capacitances $Cs$ and $Cx$ involved.

Figure 4:
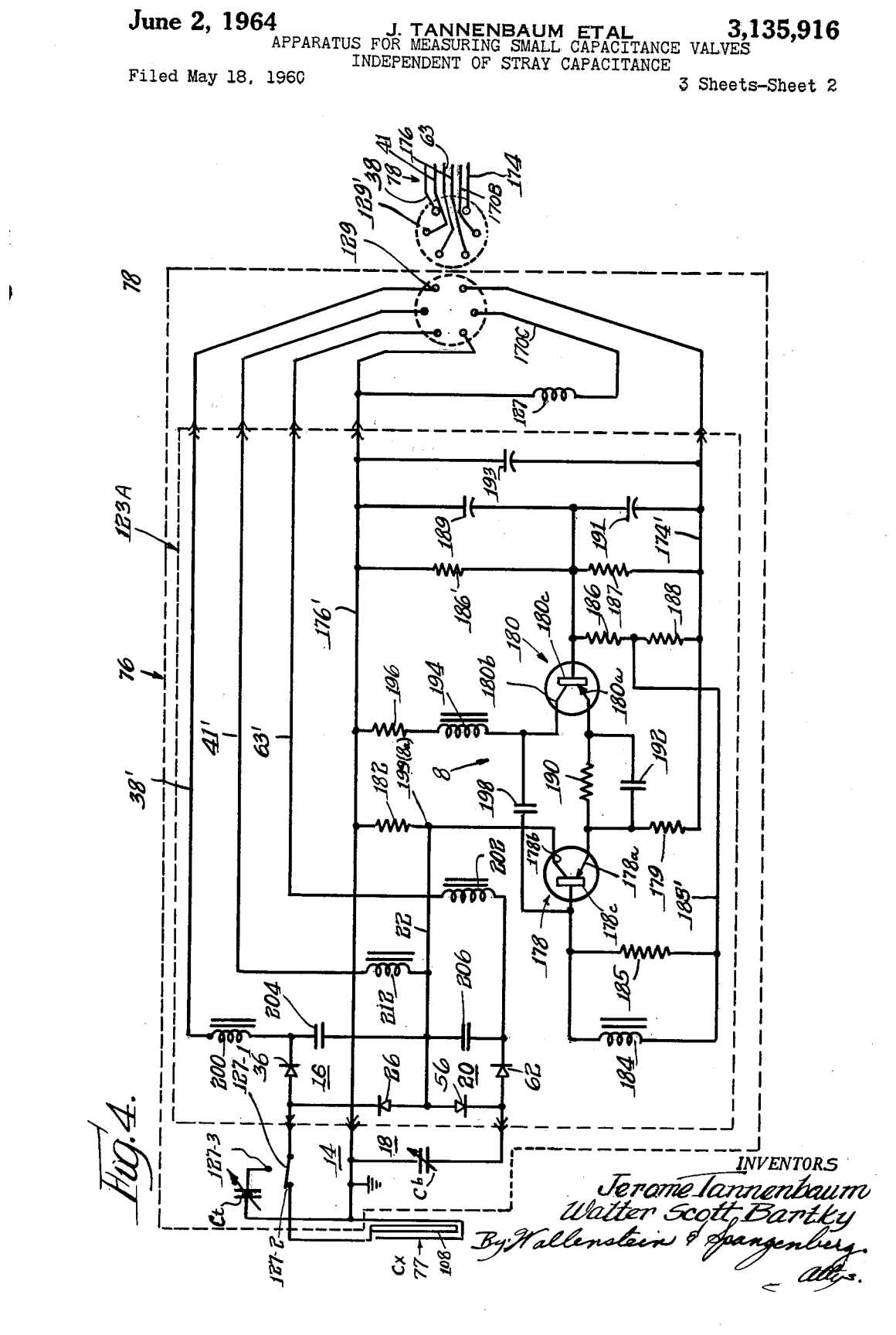

The static capacitance $Cs$ represents distributed capacitance in the circuit involved as well as any fixed or initial capacitance in the device or circuit which is connected across the input terminals 2 and 4. Thus, when the present invention is used in a liquid level indicator where a liquid immersed capacitance probe is connected across input terminals 2 and 4, the static capacitance $Cs$ would include the probe capacitance when the liquid level is at or below the bottom of the probe. If the liquid involved has dielectric constant greater than one, it is apparent that the overall capacitance of the probe will increase in proportion to the length of the probe submerged in the liquid. This application of the invention will be described in more detail in connection with the embodiment illustrated in FIGS. 2 through 5.

A rectifier 36 polarized to pass current flow from the positive voltage developed across the unknown capacitance $Cx$ is connected by a conductor 34 to the juncture of conductors 26 and 28. A conductor 38 connects the rectifier 36 to the upper end of the meter movement 6. The conductor 38 also connects with one end of a range changing resistance 40 which is illustrated as a variable resistor having tap-off terminals 42, 44 and 46 and a movable contact or wiper 48 adapted to make selective connection with the tap-off terminals. The conductor 38 is connected by a conductor 49 to the movable contact 48 and the bottom end of the range changing resistance 40 is connected to a common conductor 41 leading to the conductor 32 connected to the terminal $8b$ of the pulse generator 8. A capacitor 52 is connected between conductors 38 and 41 and is in parallel with the range changing resistance 40. The capacitor 52 acts as a filter condenser which provides a low A.C. impedance for discharge currents.

The time constant of the discharge circuit 16 is such that the unknown capacitance $Cx$ will substantially fully discharge in the interim between successive positive pulses from the pulse generator 8. It is apparent that the discharge currents flowing through the range changing resistance 40 will develop a unidirectional voltage across the resistance 40 which is filtered by capacitor 52 to produce a voltage which is proportional to the average value of the discharge current flowing in the discharge circuit 16. This voltage, in turn, is proportional to the value of the sum of the unknown capacitance $Cx$ and the static capacitance $Cs$.

The capacitor charge circuit 18 includes a rectifier 56 polarized to pass positive pulses from the pulse generator 8. One terminal of the rectifier 56 is connected by a conductor 54 to common conductor 22 leading to the signal output terminal 8a of pulse generator 8. Conductors 58 and 59 connect the other terminal of the rectifier to one plate or terminal of the balancing capacitor $Cb$. A conductor 60 connects the other terminal or plate of balancing capacitor $Cb$ to conductor 32 extending to the terminal 8b of the pulse generator. The time constant of the capacitor charge circuit 18 is such that the capacitor $Cb$ substantially is fully charged within the duration of each of the positive pulses fed to the rectifier 56 from the pulse generator.

The capacitor discharge circuit 20 includes a conductor 61 extending from the juncture of conductors 58 and 59, a rectifier 62 polarized to pass the current resulting from the positive voltage built up across the capacitor $Cb$, and conductor 63 leading to the lower end of the meter movement 6 and also to a conductor 64 connected to a variable range changing resistance 65 which is most advantageously identical to the variable resistance 40. Accordingly, the resistor 65 may comprise a resistor having tap-off terminals 66, 68 and 70 which are engageable by a movable contact or wiper 72. The conductor 64 is connected to the movable contact 72 and one end of the resistor 65 is connected to the common conductor 41 joining the conductor 32 connected ot the upper terminal or plate of the balancing capacitor $Cb$. The movable contacts 48 and 72 of variable resistors 40 and 65 are ganged together so that the two resistors are simultaneously varied to the same degree, whereby equal resistance changes occur in the discharge circuits 16 and 20 for each position of adjustment of the movable contacts 48 and 72.

A capacitor 73 is connected between conductors 63 and 41 so as to be in parallel with the range changing resistance 65. The capacitor 73 acts as a bypass condenser which provides a low A.C. impedance for discharge currents.

The time constant of the discharge circuit 20 is such that balancing capacitor $Cb$ will substantially fully discharge in the interim between successive positive pulses from the pulse generator 8. The discharge currents flowing through range changing resistance 65 will develop a unidirectional voltage across the resistance 65 which is filtered by capacitor 73 to produce a voltage which is proportional to the average value of the discharge current flowing in the discharge circuit 20. This, in turn, is proportional to the value of the balancing capacitor $Cb$.

The average value of the current which flows in the direct current meter movement 6 is proportional to the difference in the voltages developed across range changing resistances 40 and 65 as previously indicated. The value of this current is theoretically proportional to the value of the unknown capacitance $Cx$ provided the effect of the static capacitance $Cs$ is initially cancelled out by adjustment of the balancing capacitor prior to the connection of the unknown capacitance $Cx$ into the measuring circuit 10. The balancing out of the static capacitance holds for each position of adjustment of range changing resistances 40 and 65 since the two resistances are always adjusted simultaneously to the same degree. The zero or balancing adjustment of the capacitance measuring apparatus of the present invention is thus independent of the range changing adjustment.

The sensitivity or range of operation of the capacitance measuring system just described is determined by the adjustment of the range changing resistances 40 and 65. Full scale deflection of the pointer 6' of the meter movement 6 will represent a smaller capacitance where the resistance 40 is adjusted to its maximum value than when it is adjusted to a lower value.

The linearity of the measuring system just described presupposes the complete discharging of the capacitors $Cx$ and $Cb$ in the interim between successive positive pulses from the pulse generator 8. The capacitors $Cx$ and $Cb$ can discharge as long as the rectifiers 36 and 62 are conductive. However, any voltages stored in filter capacitors 52 and 73 connected across range changing resistances 40 and 65 may act as biasing potentials preventing conduction of the respective rectifiers 36 and 62 whenever the voltages across capacitors $Cx$ and $Cb$ drop below these biasing potential levels. This condition may occur when large values of static and balancing capacitances are present in the measuring circuit. In the circuit of FIG. 1, it will be usually possible to discharge capacitors $Cx$ and $Cb$ down to an insignificant fraction of the voltages to which they are initially charged. When larger values of $Cx$ are measured, the values of range change resistances 40 and 65 are made smaller so that the biasing potential stored in bypass capacitors 52 and 73 is reduced by virtue of a shorter discharge time constant. This will, of course, reduce the full scale sensitivity of the instrument described in FIG. 1 and permit linear operation over a wide range of values of $Cx$.

Refer now to FIGS. 2 through 5 which show in detail a most preferred embodiment of the form of the invention shown in FIG. 1 as applied to liquid level measuring apparatus. In this application of the invention, the basic components of the apparatus comprise a capacity probe head unit 74 including a generally spherically shaped housing 76 from which depends a capacitance probe 77, a meter and control unit 79 and a cable 78 interconnecting the capacity probe head unit 74 and the meter and control unit 79. The probe head housing 76 contains most of the components schematically illustrated in FIG. 1 except for the range changing resistances 40 and 65 and the meter movement 6. The meter and control unit 79 comprises a housing or casing 81 containing the range changing resistances and the meter movement, the latter having a scale 6a which is visible through a window in the housing 81. The housing 81 additionally has a number of control knobs generally indicated by reference number 82 which will be described in more detail hereinafter.

Referring now to FIG. 3, the spherical probe head housing 76 is made of a pair of hollow hemispherical housing parts 76a and 76b. The housing part 76a has an externally threaded neck portion 82 at its inner or wide end which threads into an internally threaded portion 86 at the inner or wide end of the housing part 76b. The two housing parts 76a and 76b may be tightly threaded together by hand or by use of a spanner wrench insertable through one or more holes 88 (FIG. 2) in the housing part 76a.

The housing part 76b has an outwardly extending neck portion 90 which extends in a direction approximately 45° of the plane of juncture between the housing parts 76a and 76b. The neck portion 90 has an internally threaded opening 92 into which is threaded a cable-receiving sleeve 94. A horizontal conduit section 98 is provided with a nut 102 adapted to thread over the sleeve 94 fixedly to secure the probe head housing 76 upon the conduit 98, which may be anchored in a horizontal position in any suitable manner.

The housing part 76b has an internally threaded socket 103 in the bottom thereof which receives the capacitance probe 77. The capacitance probe 77 has an externally threaded metal connector 104 at its upper end which threadedly fits into the socket 103. The capacitance probe has a central metallic rod 108 embedded in its upper end in a sleeve 109 of insulating material and terminating at its upper end in a terminal pin 110 which extends into a terminal socket 112 formed in a terminal member 114 supported upon a bracket 116 mounted within the housing 76. Sandwiched between the insulating sleeve 109 and the metal connector 104 is an outer metal sleeve 113 which constitutes an outer plate of a capacitor, the inner plate of which is formed by the metal rod 108. The sleeve 113 has openings 117—118 at its upper and lower ends through which the fluid to be measured may pass into the space between the sleeve 113 and the rod 108. The capacitance between the sleeve 113 and the rod 108 will vary in a linear manner with the level of the liquid therebetween.

The housing part 76b carries the aforementioned balancing capacitor Cb. The balancing capacitor has an adjusting shaft 120 passing through an opening 122 in the neck portion 90 in the housing part 76b. The shaft 120 extends to the outside of the housing 76 where it may be rotated by a suitable tool or by hand. The housing part 76b also contains a plug-in unit 123 which comprises the pulse generator 8 and the sensitive circuit components constitiuting the various aforementioned charge and discharge circuits 14, 16, 18 and 20 all embedded in a body of plastic material forming a hermetically sealed unit. The components which are so embedded are enlcosed by a dotted line 123A in FIG. 4. The plug-in unit has prongs 125 received in the terminal sockets of a connector unit 127A supported upon the aforementioned bracket 116. The bracket 116 of the housing part 76b also carries a relay 127 the purpose of which will be described later on, and a standard or test capacitor Ct of adjustable value having a slotted shaft 119 permitting adjustment of its value.

A female connector unit 129 is provided to receive the male end of a connector 129' secured at the end of the cable 78. The cable 78 passes through the conduit 98 and the cable-receiving sleeve 94 to make connection with the socket terminals of the connector 129. Conductors (not shown) interconnect the female terminals of the connector 129 with the balancing capacitor Cb, test capacitor Ct, relay 127, and the plug-in unit 123.

In addition to the meter movement 6 and range changing resistances 40 and 65, the meter and control unit housing 81 contains a direct current power supply for energizing the pulse generator 8, meter shunt resistor 68 and some other circuit elements to be described.

The electrical circuits contained within the capacitor probe head unit 74 and the meter and control unit 79 are respectively shown in FIGS. 4 and 5 to which reference should now be made. Those circuit components shown in FIGS. 4 and 5 which are also present in FIG. 1 are indicated by the same reference numerals. The power supply 132 (FIG. 5) may be a conventional one operating from a 60 cycle, 117 volt commercial power source. A power cord 133 having power conductors 134 and 136 extends from the housing 81. The conductor 134 connects with an on-off power switch 138 having a control arm 139 on the outside of the meter housing 81 (FIG. 2). The switch 138, in turn, is connected to one end of the primary winding 140 of a conventional power transformer 142. The power conductor 136 connects with the other end of the primary winding 140. The power transformer has a center tapped secondary winding 144 whose ends are respectively connected to similarly arranged rectifiers 146 and 148 which form with the secondary winding 144 a full wave rectifier circuit providing positive voltage pulsations. The terminals of the rectifiers 146 and 148 remote from the secondary winding 144 are connected together at 149. A conductor 152 extends from the center tap of the secondary winding 144 to an incandescent lamp 154 mounted on or visible from the outside of the housing 81 (FIG. 2). The side of the lamp 154 remote from the secondary winding 144 is connected to ground. Energization of lamp 154 indicates that power is being fed to the power supply.

A common conductor 155 extends from the common terminals of the rectifiers 146 and 148 to a filter network 156. The filter network as shown comprises a pair of filter capacitors 158–159, one of which is connected between the common conductor 155 and ground and the other of which is connected between an output conductor 160 and ground. A resistor 161 is connected between the ungrounded ends of capacitors 158 and 159. A Zener diode 161' is connected across the output of filter network 156 to regulate the voltage output of the power supply and to lower the effective impedance thereof. The regulated and filtered direct current voltage produced by the power supply is coupled by output conductor 160 to a terminal 162 of a cable receiving connector 163 mounted on or accessible from the outside of the housing 81. A grounded conductor 164 is provided which terminates at a terminal 166 of the connector 163. A relay control conductor 168 extends between the common conductor 155 to a normally-open test pushbutton switch 170 on the outside of the housing 81 (FIG. 2). The switch 170 is connected to a terminal 172 of connector 163. The connector terminals 162, 166 and 172 make connection with corresponding terminals 162', 166' and 172' of a connector 173 on the end of cable 78. The connectors 173 and 163 may be complementary plug and socket connectors well known in the art.

The cable connector terminals 162' and 166' which respectively represent the hot or positive and the grounded terminals of the power supply 132 extend respectively through cable conductors 174 and 176 to the male connector 129' on the end of cable 78 which plugs into the female connector 129 in the housing part 76b.

As previously indicated, the pulse generator 8 is preferably a transistor circuit. To this end, the pulse generator 8 most advantageously comprises a pair of PNP transistors 178 and 180. The transistor 178 has an emitter electrode 178a connected through resistor 179 to positive conductor 174' which is connected to the aforesaid hot cable conductor 174 through terminals of connectors 129—129'. The transistor 178 has a collector electrode 178b which is connected through a load resistor 182 to ground conductor 176' which is connected to the aforesaid grounded cable conductor 176 through connectors 129—129'. The latter transistor has a base electrode 178c connected through parallel connected choke 184 and resistor 185 and a conductor 185' to the juncture of a pair of resistors 186 and 188. The remote terminal of resistor 188 is connected to the positive conductor 174' and the remote terminal of resistor 186 is connected to the base electrode 180c of the transistor 180.

The transistor 180 has an emitter electrode 180a connected through parallel connected resistor 190 and capacitor 192 to the emitter electrode 178a of transistor 178. The transistor 180 has a collector electrode 180b connected through a choke 194 and a resistor 196 to the ground conductor 176'. A feed-back capacitor 198 is connected between the collector electrode 180b of transistor 180 and the base electrode 178c of the transistor 178.

A resistor 186' is connected between the base electrode 180c of transistor 180 and ground conductor 176', and a resistor 187 is connected between the base electrode 180c and the positive conductor 174'. The resistor 186' is shunted by a bypass capacitor 189 and resistor 187 is shunted by a bypass capacitor 191. A bypass capacitor 193 is connected between the positive and ground conductors 174' and 176'.

The transistors 178 and 180 are used as on-off switches having either highly conductive states or relatively non-conductive states. The transistor 178 is an output transistor which is in a relatively non-conductive state when the capacitances Cx and Cb are to be discharged and is in a highly conductive state when these capacitances are to be charged. The transistor 180 conducts when the transistor 178 is non-conductive and is non-conductive when the transistor 178 conducts (considering steady state conditions of the circuit). The potential at the lower terminal of the load resistor 182 is a positive potential (for example, approximately 10 volts) when the transistor 178 is conducting and is substantially at ground potential when the transistor 178 is non-conductive. The capacitor 198 and the choke 184 together form a timing network which determines the time transistor 178 is non-conductive. The resistor 190 and the capacitor 192 associated with the emitter electrode 180a of transistor 180 determines the time during which the transistor 180 is non-conductive. The resistor 190 additionally acts to provide direct current degeneration for transistor 180 so that temperature variations of the transistor 180 are minimized. The resistor 179 associated with the emitter electrodes of both transistors 178 and 180 provides for emitter degeneration for temperature stabilization and additionally developes positive feedback for the pulse generator circuit.

The choke 194 connected to the collector electrode 180b of transistor 180 provides a rapidly rising voltage waveform so that the transistor 178 is switched as rapidly as possible. Resistors 186' and 187 connected to the base electrode 180c of transistor 180 form a bias network of low direct current impedance to provide temperature compensation for transistor 180. The associated resistors 186 and 188 provide a low impedance bias network for the base electrode 178c of transistor 178. They also provide a high enough alternating current impedance so that oscillations will start when power is initially turned on. Resistor 185 connected in parallel with the choke 184 acts as a damping resistor to prevent spurious oscillations.

The capacitors 189 and 191 bypass signal currents from the base electrode 180c of transistor 180. They also bypass low radio frequency currents which may be induced in the power supply conductors 174 and 176. Capacitor 193 serves a similar purpose for high radio frequency currents which may be induced into the latter conductors.

The transistor circuit just described is one providing a square wave output at an output terminal 199 connected to the collector electrode 178b of transistor 178. This output most advantageously is of a very high frequency, for example, one megacycle or higher. The higher the frequency of the pulse generator the more sensitive will be the measuring circuit. The particular frequency desired, of course, depends somewhat upon the cost and sensitivity requirements involved. The sensitivity S (and voltage output) of the capacitance measuring circuit is illustrated by the following relationship where F is the frequency and V is the voltage output of the transistor circuit, and C is the capacitance involved: $S = KCVF$ ($K$ = constant).

The aforesaid test relay 127 is located within the capacitance probe head housing 76 and is electrically connected between the grounded conductor 176' and conductor 170C respectively connected with cable conductors 176 and 170B through connectors 129—129'. Cable conductor 170B is connected through connector terminal 172, normally-open pushbutton switch 170 and conductor 168 to the positive voltage input to the power supply filter network 156. Accordingly, when the pushbutton switch 170 is closed, test relay 127 will be energized. The latter relay has a movable contact 127-1 which contacts a stationary contact 127-2 when the relay 127 is de-energized and stationary contact 127-3 when the relay is energized. The terminal of the capacity probe 77 constituted by the rod 108 is connected to the stationary contact 127-2 so that, normally, the capacitance of the probe is connected into the measuring circuit. The test capacitor Ct is connected between the contact 127-3 and ground conductor 176' so that the test capacitor Ct is substituted for the probe whenever the relay 127 is energized. Capacity Ct would have a fixed predetermined value for calibration purposes if the circuit were to be used as a capacitance measuring means with readings to be directly in capacitance units. However, when it is used as a liquid level measuring means, Ct is most advantageously an adjustable capacitor which is adjusted to provide full scale deflection on the meter 6. The operator inserts the capacitor Ct in the circuit to see if full scale deflection of the meter pointer results to test for the proper operation of the circuit.

The output terminal 199 of the pulse generator circuit 8 is connected by the conductor 22 to the charge rectifiers 26 and 56 respectively associated with charge circuits 14 and 18 which, as above described, are substantially identical to the corresponding circuits previously described in connection with the circuit of FIG. 1. When the transistor 178 is conducting, 10 volts applied to the conductor 22 is operative to charge the probe capacitance Cx to 10 volts through the rectifier 26 and the balancing capacitor Cb to 10 volts through the rectifier 56. When the transistor 178 is non-conductive, ground potential is present at the conductor 22 which effects the discharging of the capacitor Cx and the capacitor Cb through the rectifiers 62 and 36. Capacitor discharge circuits 16 and 20 are provided which are similar to the correspondingly numbered circuits in FIG. 1 in most respects. These circuits include rectifiers 36 and 62 respectively connected to meter isolating chokes 200 and 202 which (together with bypass capacitors 204 and 206) filter out varying current components from the cable 78. Bypass capacitors 204 and 206 are respectively connected between the juncture of choke 200 and rectifier 36, on the one hand, and choke 202 and rectifier 62, on the other hand, to the conductor 22 and constitute that portion of the discharge circuits 16 and 20 which handle the varying or alternating components of the discharge currents. The chokers 200 and 202 and capacitors 204 and 206 effectively isolate the cable 78 from that portion of the measuring circuit which determines the capacitance measurement. So for all practical purposes, changes in cable length do not affect the accuracy of the circuit and the cable length does not place any significant limitations thereon. The chokes 200 and 202 are respectively connected by conductors 38' and 63' to terminals of female connector 129 connected to cable conductors 38 and 63 of cable 78. An isolating choke 212 serving the same purpose as chokes 200 and 202 is connected between conductor 22 and a conductor 41' leading to a terminal of female connector 129 connected to a conductor 41 of cable 78.

The cable conductors 38, 41 and 63 are connected through the connectors 173 and 163 (FIG. 5) to respective conductors 38", 41" and 63" in the meter and control unit housing 81. The latter conductors are connected into a meter circuit similar to that shown in FIG. 1. Thus, conductor 38" is connected to the movable contact 48 of a variable range changing resistance 40 having tap-off points 42, 44 and 46 with which movable contact 48 makes contact. Conductor 63" is connected to the movable contact 72 of a variable range changing resistance 65 having tap-off points 66, 68 and 70 with which movable contact 72 makes contact. The movable contacts 48 and 72 are ganged together and are operated by a range change control knob 216 (FIG. 2) located on the front of the housing 81. The corresponding inner ends of the resistances 40 and 65 are connected to the conductor 41″.

A full scale adjusting resistor 68 is connected in parallel with the meter movement 6 which is connected between the conductors 38″ and 63″. The resistor 68 may be controlled from a control knob 220 (FIG. 2) on the front of the housing 81.

In using the liquid level measuring apparatus shown in FIGS. 2–5, after the power has been turned on and the equipment warmed up, the control shaft 120 for the balancing capacitor $Cb$ is varied to provide a zero reading of the pointer 6′ on the scale 6a of the meter movement with the liquid at its lowest point. As previously explained, this zero adjustment which balances out static capacitance effects applies to all of the ranges of the apparatus since the resistances inserted into the discharge circuits 16 and 20 by the range changing resistance means 40 and 65 are identical for each range. Next, the fluid to be used is permitted to rise in capacitance probe 77, shown in FIG. 2, to the desired full level. Range switch 216 is adjusted to keep the meter indication of meter 6 to just more than full scale reading. Control knob 220 which operates potentiometer 68 is now retarded to give an exact full scale reading of meter pointer 6′ on meter 6 with full immersion of probe 77. Now push button 170 is depressed to energize the test relay 127 which, as above explained, inserts the capacitor $Ct$ into the measuring circuit in place of the capacitance probe 77. The capacitance of $Ct$ is then adjusted by removing cover 76a and turning shaft 119 so that pointer 6′ of the meter movement 6, again, reads full scale. Cover 76a is now restored and the circuit can then be tested for proper operation merely by depressing push button 170 and observing full scale deflection of meter pointer 6′.

The measuring apparatus is then ready to measure the level of the liquid involved where small capacity changes are clearly indicated on the linear scale 6a of the meter movement. The variable ranges are made available for use with different liquids which may have different dielectric constants which provide different ranges of capacity.

As previously indicated, the length of the cable 78 connected between the capacitance probe head housing 76 and the meter and control unit housing 81 will have no significant effect on the meter reading since the stray capacitance of the cable is isolated from the portions of the charge and discharge circuits of the measuring circuit carrying non-direct current components which determine the values of the direct current voltage to which the direct current meter movement responds.

As previously indicated, the plastic embedded components in the plug-in unit 123 forming the various parts of pulse generator 8 and the aforesaid charge and discharge circuits provide a circuit which is not liable to be affected by humidity changes. The measuring circuit is in other respects also a rugged and reliable one.

The capacitance measuring circuit of the present invention is an exceedingly sensitive linear and accurate means for measuring very small capacitance values and particularly small changes in capacitance in the presence of a large static capacitance. In addition to its use as a straight capacitance measuring circuit and as a liquid level indicator, the characteristics of the present invention make it very useful in wide variety of applications, such as amplification of piezoelectric changes in piezoelectric transducers through capacitance variations thereof, and the measurements of dielectric constants of solids, gases, liquids and mixtures thereof, or measurements of various qualities of gaseous, liquid or solid materials dependent on variations of their dielectric constants, such as relative humidity, measurement of moisture content in solids, and other measurements of the relative proportions of two materials having different dielectric constants.

It should be understood that numerous modifications may be made in the form of the invention above described without deviating from the broader aspects of the invention.

What we claim as new and desire to protect by Letters Patent of the United States is:

1. Capacitance measuring apparatus comprising: a direct current meter for indicating the value of the capacitance to be measured; a pulse generator providing a continuous train of pulses of at least one given polarity; a measuring circuit comprising: a capacitor charge circuit coupled to said pulse generator to receive said pulses therefrom and including rectifier means for blocking current flowing in a direction opposite to the current resulting from said pulses; the capacitor charge circuit including terminal means for connecting the capacitor to be measured into the charge circuit, said capacitor charge circuit having a time constant which effects substantially the full charging of the largest capacitor to be measured within the duration of each of said pulses, and a capacitor discharge circuit having a time constant which effects substantially the full discharging of said capacitor in said measuring circuit in the interim between the generation of successive ones of pulses and including rectifier means for blocking current flow in a direction opposite to the flow of the discharge current from the latter capacitor; a balancing circuit comprising: a second capacitor charge circuit coupled to said pulse generator to receive said pulses therefrom and including rectifier means for blocking current flowing in a direction opposite to current resulting from said pulses and a variable balancing capacitor to be charged, said second capacitor charge circuit having a time constant which effects substantially the full charging of the balancing capacitor therein within the duration of each of said pulses; and a second capacitor discharge circuit for the capacitor in said second charge circuit which effects substantially the full discharging of said balancing capacitor in the interim between successive ones of said pulses and including rectifier means for blocking current flow in a direction opposite to the flow of the discharge current from the latter capacitor; and said direct current meter being differentially connected to said measuring and balancing circuits to receive current flowing in opposite directions respectively from said measuring and balancing circuits, to provide a resultant indication indicating the excess of the capacitance to be measured over the static capacitance in the measuring circuit, said variable balancing capacitor of said balancing circuit being effective for adjusting the reading of said meter to zero when the capacitance of said measuring circuit represents only said static capacitance.

2. Capacitance measuring apparatus comprising: a direct current meter for indicating the value of the capacitance to be measured, a transistor square wave pulse generator circuit providing a continuous train of similar pulses of a given polarity and including rectifier means for blocking current flowing in a direction opposite to the current resulting from said pulses; a measuring circuit comprising: a capacitor charge circuit coupled to said pulse generator to receive said pulses therefrom, the capacitor charge circuit including terminal means for connecting the capacitor to be measured into the charge circuit, and a capacitor discharge circuit which effects discharging of said capacitor in said measuring circuit in the interim between the generation of successive ones of said pulses and including rectifier means for blocking current flow in a direction opposite to the flow of the discharge current from the latter capacitor; a balancing circuit comprising: a second capacitor charge circuit coupled to said pulse generator to receive said pulses therefrom and including rectifier means for blocking current flowing in a direction opposite to the current resulting from said pulses and a capacitor to be charged, and a second capacitor discharge circuit for the capacitance in said second charge circuit which effects the discharging of the latter capacitor in the interim between successive ones of said pulses and including rectifier means for blocking current flow in a direction opposite to the flow of the discharge current from the latter capacitor; and said direct current meter being differentially connected to said measuring and balancing circuits to receive current flowing in opposite directions respectively from said measuring and balancing circuits, to provide a resultant indication indicating the excess of the capacitance to be measured over the static capacitance in the measuring circuit, said balancing circuit including time constant varying means for adjusting the reading of said meter to zero when the capacitance of said measuring circuit represents only said static capacitance.

References Cited in the file of this patent

UNITED STATES PATENTS

| | | |
|---|---|---|
| 2,200,863 | Schuck | May 14, 1940 |
| 2,375,084 | Coroniti et al. | May 1, 1945 |
| 2,541,743 | Brockman et al. | Feb. 13, 1951 |
| 2,558,945 | Fritzinger | July 3, 1951 |
| 2,575,492 | Dittmann | Nov. 20, 1951 |
| 2,666,896 | Harris | Jan. 19, 1954 |
| 2,940,037 | Lide | June 7, 1960 |

FOREIGN PATENTS

| | | |
|---|---|---|
| 674,308 | Great Britain | June 18, 1952 |

OTHER REFERENCES

New Bridge Technique by Thomas Roddam in Wireless World, January 1950, pages 8–10.